US012761376B2

(12) United States Patent
Yao et al.

(10) Patent No.: US 12,761,376 B2
(45) Date of Patent: Oct. 13, 2026

(54) UNAMBIGUOUS POSITIONING METHOD FOR SATELLITE NAVIGATION SYSTEM B1 WIDEBAND COMPOSITE SIGNAL, AND APPARATUS THEREOF

(71) Applicant: Tsinghua University, Beijing (CN)

(72) Inventors: Zheng Yao, Beijing (CN); Yunhan Qi, Beijing (CN); Mingquan Lu, Beijing (CN)

(73) Assignee: Tsinghua University, Beijing (CN)

( * ) Notice: Subject to any disclaimer, the term of this patent is extended or adjusted under 35 U.S.C. 154(b) by 218 days.

(21) Appl. No.: 18/840,397

(22) PCT Filed: Feb. 21, 2023

(86) PCT No.: PCT/CN2023/077393
§ 371 (c)(1),
(2) Date: Aug. 21, 2024

(87) PCT Pub. No.: WO2023/155920
PCT Pub. Date: Aug. 24, 2023

(65) Prior Publication Data
US 2025/0189682 A1 Jun. 12, 2025

(30) Foreign Application Priority Data
Feb. 21, 2022 (CN) ........................ 202210156560.0

(51) Int. Cl.
*G01S 19/44* (2010.01)

(52) U.S. Cl.
CPC .................................... *G01S 19/44* (2013.01)

(58) Field of Classification Search
CPC ........................................................ G01S 19/44
(Continued)

(56) References Cited

U.S. PATENT DOCUMENTS 7,180,445 B2 * 2/2007 Martin .................... G01S 19/30 375/150
9,000,975 B2 * 4/2015 Wendel ................... G01S 19/44 342/357.27
(Continued)

FOREIGN PATENT DOCUMENTS

CN 106291625 A 1/2017
CN 106291637 A 1/2017
(Continued)

OTHER PUBLICATIONS

English translation of International Search Report of the ISA/CN in PCT/CN2023/077393 dated May 11, 2023, 5 pages.
(Continued)

*Primary Examiner* — Michael W Justice
(74) *Attorney, Agent, or Firm* — Ice Miller, LLP; Justin Swindells; Brian J. Lum

(57) ABSTRACT

Provided are an unambiguous positioning method for a satellite navigation system B1 wideband composite signal and an apparatus thereof, which can determine observed quantities of a plurality of satellites by means of tracking B1C signals and B1I signals in B1 wideband composite signals, determine a code pseudo-range value and pseudo-range value from each satellite to a receiver by means of the observed quantities, utilize the pseudo-range values and the code pseudo-range values to calculate ambiguity floating-point solutions of propagation delays of the B1 wideband composite signals, and obtain ambiguity integer solutions by means of the ambiguity floating-point solutions, so as to correct erroneously estimated propagation delay ambiguities of the B1 wideband composite signals, thereby obtaining unambiguous pseudo-range values, and implementing unambiguous and highly precise positioning of the location of the receiver.

20 Claims, 4 Drawing Sheets

(58) Field of Classification Search
USPC .................................................... 342/357.27
See application file for complete search history.

(56) References Cited

U.S. PATENT DOCUMENTS

| | | | | |
|---|---|---|---|---|
| 10,866,324 | B2 * | 12/2020 | Jardak | G01S 19/32 |
| 11,635,527 | B2 * | 4/2023 | Cui | G01S 19/32<br>342/357.72 |
| 2005/0175075 | A1 * | 8/2005 | Martin | G01S 19/32<br>375/150 |
| 2012/0026035 | A1 * | 2/2012 | Wendel | G01S 19/44<br>342/357.27 |
| 2016/0377727 | A1 * | 12/2016 | Jardak | G01S 19/30<br>342/357.26 |
| 2016/0377729 | A1 * | 12/2016 | Jardak | G01S 19/33<br>342/357.27 |
| 2017/0003399 | A1 | 1/2017 | Jardak et al. | |
| 2020/0301023 | A1 * | 9/2020 | Cui | G01S 19/32 |

FOREIGN PATENT DOCUMENTS

| | | | |
|---|---|---|---|
| CN | 106918822 | A | 7/2017 |
| CN | 108008422 | A | 5/2018 |
| CN | 112578422 | A | 3/2021 |
| CN | 113703021 | A | 11/2021 |
| CN | 114063124 | A | 2/2022 |
| EP | 3141931 | A1 | 3/2017 |

OTHER PUBLICATIONS

Wendel, J., et al., "A Robust Technique for Unambiguous BOC Tracking", NAVIGATION: Journal of the Institute of Navigation, Fall 2014, 61(3):179-190.

Gao, Y., et al., "High-precision unambiguous tracking technique for Bds B1 wideband composite signal", NAVIGATION, 2020, 67:633-650.

Qi, Y., et al., "Robust unamibuous ranging technique for BDS-3 B1 wideband composite signals", GPS Solutions, Aug. 5, 2022, 26:115, 15 pages.

Bo, Q., et al., "Unambiguous tracking method for CBOC modulated signal based on dual loop estimate", J. Huazhong Univ. of Sci. & Tech. (Natural Science Edition), Aug. 2014, 42(8):58-62 (English abstract only).

* cited by examiner

UNAMBIGUOUS POSITIONING METHOD FOR SATELLITE NAVIGATION SYSTEM B1 WIDEBAND COMPOSITE SIGNAL, AND APPARATUS THEREOF

CROSS-REFERENCE TO RELATED APPLICATIONS

This application is a national stage of International Application No. PCT/CN2023/077393, filed on Feb. 21, 2023, which claims the priority from Chinese Patent Application No. 202210156560.0, filed on Feb. 21, 2022 and titled “Unambiguous Positioning Method for Wideband Composite Signal B1 of Satellite Navigation System, and Apparatus Thereof.” Both of the aforementioned applications are hereby incorporated by reference in their entireties.

TECHNICAL FIELD

Embodiments of the present disclosure relate to the field of satellite navigation and positioning. In particular, an unambiguous positioning method for B1 wideband composite signals of a satellite navigation system, and an apparatus thereof are provided.

BACKGROUND

Currently, the development of location-information-based service industries requires an increasingly high positioning precision of the global navigation satellite system (GNSS). In order to meet the demand for high-precision positioning on emerging new applications, a new generation of satellite navigation signals has been designed to increase an upper limit of the potential capability of ranging precision.

The new generation of GNSS satellite navigation signals commonly introduces subcarrier modulation. Compared with binary phase shift keying (BPSK) signals in the conventional GNSS, satellite navigation signals with modulated subcarriers, such as BOC modulated signals using square wave subcarriers, MBOC modulated signals using multiplexed subcarriers, AltBOC modulated signals using double-sideband subcarriers, asymmetric constant envelope ACE-BOC modulated signals and single-sideband SCBOC modulated signals, have better frequency domain separation characteristics and wider Gabor bandwidth, thereby having the potential for higher-precision ranging. While the upper limit of the potential capability of ranging precision has been improved through signal upgrading, a corresponding advanced reception processing algorithm is also needed to bring potential high performance embedded in the upgraded signals into practical use. On the one hand, the reception technology needs to be able to track the signals with high precision, on the other hand, since multi-peaked ACF of the subcarrier modulated signals introduces an ambiguity threat for code tracking, leading to unreliable positioning results, the reception technology also needs to be able to eliminate the ambiguity threat to achieve reliable tracking and positioning.

Wideband composite signals broadcast on BDS3 satellites through CEMIC technology at a B1 frequency point of the third-generation BeiDou Navigation Satellite System (BDS3) consists of open service signals B1C and B1I, here, in order to be compatible with B1I signals of the second-generation BeiDou Navigation Satellite System (BDS2), BDS3 B1I signals are modulated using SCBOC (14,2). Since SCBOC (14,2) modulated signals belong to high-order BOC signals, BDS3 B1 wideband composite signals have a potential of extremely high precision ranging.

Currently, in the process of signal tracking, the satellite navigation signals need to be multiplied by local carriers to obtain baseband signals, the baseband signals are then multiplied by local codes and integrated to obtain relevant values, a subcarrier phase and a carrier phase of the B1I signals modulated using SCBOC (14,2) are both in a cos function, which are severely coupled, and it is difficult for conventional tracking technology to accurately estimate both the subcarrier phase and the carrier phase under the condition of only tracking the SCBOC (14,2) modulated signals. The existing cross-assisted tracking algorithm uses the BDS3 B1C signal and the BDS3 B1I signal to assist each other in tracking to solve the problem of severe coupling between the subcarrier phase and the carrier phase of SCBOC (14,2), but this technology does not solve the problem of ambiguity tracking, and its ranging and positioning results are unreliable.

In addition, an autocorrelation function of the SCBOC (14,2) signals is multi-peaked, which may bring severe ambiguity tracking problems for signal tracking. Currently, technologies for solving the ambiguity tracking problems fall into three main categories: the first category is one-dimensional unambiguous tracking technology, such as Bump Jump, BPSK-like, and PUDLL, which is very effective for low-order BOCs, but may fail when the order of BOC signals increases; the second category is two-dimensional unambiguous tracking technology, such as generic DET and DPE, for simple BOC signals, and tracking algorithms for AltBOCs having complex structures, and the two-dimensional unambiguous tracking technology is more general and can provide more reliable tracking results, compared with the one-dimensional unambiguous tracking technology. However, this technology still suffers from ambiguity tracking problems, when the signals of two-dimensional tracking belong to high-order BOC signals, have a low carrier-to-noise ratio, or are subjected to severe multipath effects; and the third category is technology based on parameter estimation, which is based on the two-dimensional unambiguous tracking technology, and further corrects subcarrier observed quantities having ambiguity problems, so that the ranging and positioning results are more reliable. However, the subcarrier ambiguity obtained by this method has a large error, which cannot guarantee to fix all observed quantities of subcarriers having ambiguity problems.

Currently, there is no processing technology that can guarantee unambiguous ranging and positioning of SCBOC (14,2).

SUMMARY

Embodiments of the present disclosure provide an unambiguous positioning method and apparatus for B1 wideband composite signals of a satellite navigation system that may at least partially solve the above problems, or other problems, in the related art.

The present disclosure provides an unambiguous positioning method and apparatus for B1 wideband composite signals of a satellite navigation system, capable of determining observed quantities of multiple satellites by tracking B1C signals and B1I signals in the B1 wideband composite signals, and determining pseudo-range values and code pseudo-range values from the satellites to a receiver based on the observed quantities, obtaining ambiguity float solutions of propagation delays of the B1 wideband composite signals by using the pseudo-range values and the code pseudo-range values, and obtaining ambiguity integer solutions by using the ambiguity float solutions to correct erroneously estimated propagation delay ambiguities of the B1 wideband composite signals, thereby obtaining unambiguous pseudo-range values, and implementing unambiguous and highly precise positioning of the location of the receiver.

An aspect of the present disclosure provides an unambiguous positioning method for B1 wideband composite signals of a satellite navigation system, including: receiving B1 wideband composite signals of multiple satellites via a receiver, where, the B1 wideband composite signals include B1I signals and B1C signals; acquiring observed quantities of the B1I signals and the B1C signals of the multiple satellites; determining, based on the observed quantities, pseudo-range values and code pseudo-range values from the satellites to the receiver; determining, based on the pseudo-range values and the code pseudo-range values, ambiguity float solutions of propagation delays of the B1 wideband composite signals; and correcting ambiguities of the propagation delays of the B1 wideband composite signals by using the ambiguity integer solutions, acquiring unambiguous propagation delays of the B1 wideband composite signals, and performing unambiguous positioning on a location of the receiver, based on the unambiguous propagation delays of the B1 wideband composite signals.

In an embodiment of the present disclosure, the observed quantities include: carrier phases of the B1C signals, code propagation delays of the B1I signals, and subcarrier propagation delays of the B1I signals.

In an embodiment of disclosure, propagation delays of the B1I signals are determined by combining the code propagation delays and the subcarrier propagation delays; and pseudo-range values are determined based on the propagation delays of the B1I signals, and the code pseudo-range values are determined based on the code propagation delays.

In an embodiment of the disclosure, a step of acquiring observed quantities of the B1I signals and the B1C signals includes: determining carrier frequencies of the B1C signals and the carrier phases of the B1C signals, based on the code propagation delays of the B1C signals and the B1I signals, and a carrier tracking loop; determining the carrier phases of the B1C signals based on the carrier frequencies of the B1C signals and the carrier phases of the B1C signals; and determining the code propagation delays of the B1I signals, based on a code tracking loop of the B1I signals.

In an embodiment of the disclosure, a step of acquiring observed quantities of the B1I signals and the B1C signals includes: determining spreading code frequencies and phases of the B1I signals, based on the carrier frequencies and phases of the B1I signals and the B1C signals, and the code tracking loop of the B1I signals; determining the code propagation delays of the B1I signals, based on the spreading code frequencies and phases of the B1I signals; determining subcarrier frequencies and phases of the B1I signals, based on the carrier frequencies and phases of the B1I signals and the B1C signals, and a subcarrier tracking loop; and determining the subcarrier propagation delays of the B1I signals, based on the subcarrier frequencies and phases of the B1I signals.

In an embodiment of the disclosure, a step of determining pseudo-range values and code pseudo-range values from the satellites to the receiver includes: determining the code pseudo-range values by using the carrier phases of the B1C signals and the code propagation delays of the B1I signals; and determining the pseudo-range values by using the subcarrier propagation delays of the B1I signals and the code propagation delays of the B1I signals.

In an embodiment of the disclosure, a step of determining, based on the observed quantities, pseudo-range values and code pseudo-range values from the satellites to the receiver include: smoothing the code propagation delays, based on the carrier phases of the B1C signals; and determining the pseudo-range values and the code pseudo-range values from the satellites to the receiver, based on the propagation delays of the B1I signals and the smoothed code propagation delays.

In an embodiment of the disclosure, a step of determining the ambiguity integer solutions based on the ambiguity float solutions includes: determining, using a LAMBDA algorithm, the ambiguity integer solutions based on the ambiguity float solutions.

Another aspect of the present disclosure provides an unambiguous positioning apparatus for B1 wideband composite signals of a satellite navigation system, including: a memory, storing instructions executable by a computer; and a processor, executing the instructions to perform any method as described above.

Another aspect of the present disclosure provides a storage medium, storing computer-executable instructions, where the instructions, when executed by one or more processors, implement any method as described above.

BRIEF DESCRIPTION OF THE DRAWINGS

In order to more fully understand the present disclosure and advantages thereof, reference is now made to the following description in conjunction with the accompanying drawings, in which the same reference numerals indicate the same parts.

DETAILED DESCRIPTION OF EMBODIMENTS

Figure 1:
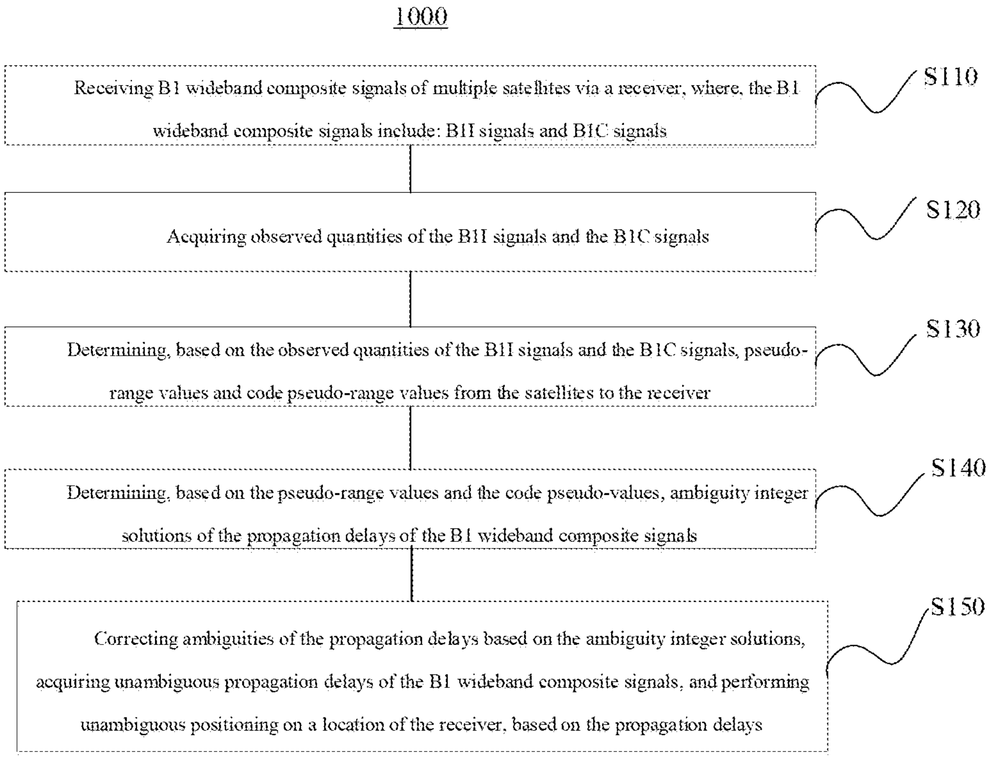
FIG. 1 illustrates a flowchart of an unambiguous positioning method for B1 wideband composite signals of a satellite navigation system according to an embodiment of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements.

The expression "and/or" includes any and all combinations of one or more of the associated listed items.

It should also be understood that the expressions such as "comprising," "including," "having," "containing" and/or "contains," are open-ended rather than closed-ended expressions in this specification, indicating the presence of stated features, elements and/or components, but do not exclude the presence of one or more other features, elements, components and/or combinations thereof. In addition, when an expression such as "at least one" appears after a list of listed features, it modifies the entire list of features, not just individual elements in the list. In addition, when describing embodiments of the present disclosure, the use of "may" indicates "one or more embodiments of the present disclosure". Furthermore, the term "exemplary" is intended to refer to an example or illustration.

Unless otherwise defined, all terms (including engineering and scientific terms) used herein have the same meaning as commonly understood by those of ordinary skill in the art to which the present disclosure belongs. It should be further understood that terms defined in commonly used dictionaries should be interpreted as having a meaning that is consistent with their meaning in the context of the relevant art and will not be interpreted in an idealized or overly formal sense unless expressly so defined herein.

It should be noted that embodiments in the present disclosure and the features in the embodiments may be combined with each other on a non-conflict basis. Embodiments of the present disclosure will be described below in detail with reference to the accompanying drawings. Furthermore, unless expressly limited or contradicted by the context, specific steps included in the method recorded in the present disclosure need not be limited to the order recorded, but may be performed in any order or in parallel. The present disclosure will be described in detail below with reference to the accompanying drawings and in conjunction with the embodiments.

An aspect of the present disclosure provides an unambiguous positioning method for B1 wideband composite signals of a satellite navigation system. FIG. 1 illustrates a flowchart of an unambiguous positioning method for B1 wideband composite signals of a satellite navigation system according to an embodiment of the present disclosure. As shown in FIG. 1, the method 1000 includes:

- S110, receiving B1 wideband composite signals of multiple satellites via a receiver, where the B1 wideband composite signals include: B1I signals and B1C signals;
- S120, acquiring observed quantities of the B1I signals and the B1C signals of the multiple satellites;
- S130, determining, based on the observed quantities of the B1I signals and the B1C signals, pseudo-range values and code pseudo-range values from the satellites to the receiver;
- S140, determining, based on the pseudo-range values and the code pseudo-values, ambiguity integer solutions of the propagation delays of the B1 wideband composite signals;
- S150, correcting ambiguities of the propagation delays of the B1 wideband composite signals by using the ambiguity integer solutions, acquiring unambiguous propagation delays of the B1 wideband composite signals, and performing unambiguous positioning on a location of the receiver, based on the unambiguous propagation delays of the B1 wideband composite signals.

The above steps will be further described below.

In step S110, the B1 wideband composite signals of the multiple satellites are received by the receiver, where the B1 wideband composite signals include: the B1I signals and the B1C signals. In an embodiment, the receiver is applicable to satellite navigation signals, such as a GPS receiver.

In step S120, the observed quantities of the B1I signals and the B1C signals received in step S110 are acquired. In an embodiment, the observed quantities of the B1I signals and the B1C signals may include: carrier phases of the B1C signals, code propagation delays of the B1I signals, and subcarrier propagation delays of the B1I signals; the code pseudo-range values are determined by the carrier phases of the B1C signals and the code propagation delays of the B1I signals, and the pseudo-range values are determined by the subcarrier propagation delays of the B1I signals and the code propagation delays of the B1I signals.

Figure 2:
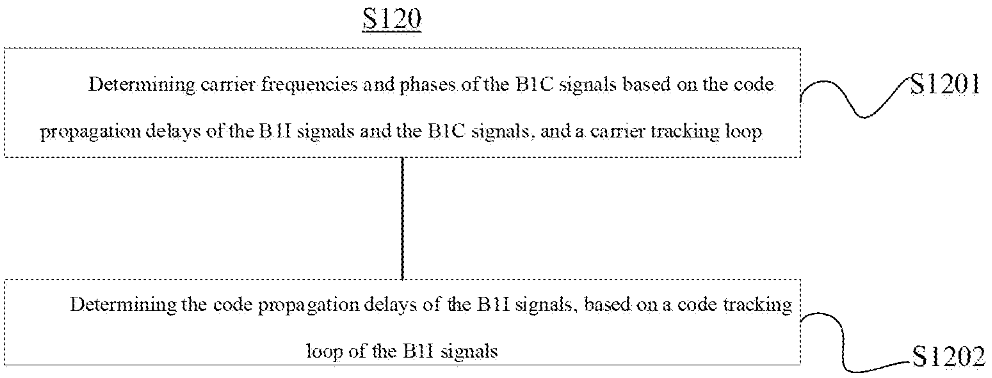
FIG. 2 illustrates a flowchart of acquiring observed quantities of B1C signals according to an embodiment of the present disclosure.

FIG. 2 illustrates a flowchart of acquiring observed quantities of B1C signals according to an embodiment of the present disclosure. For a given satellite, a BDS3 B1C signal has a same carrier frequency and a same Doppler frequency as a BDS3 B1I signal, and the carrier phases of the BDS3 B1C signal and the BDS3 B1I signal are strictly equal, i.e., when carrier information of either signal is determined, carrier information of the other signal may also be determined. Since the B1C signal in a BDS3 B1 wideband composite signal is a real signal and there is no coupling between the carrier phase and the subcarrier phase of SCBOC (14,2), accurate carrier information of the B1C signal may be acquired by using a carrier tracking loop (PLL), thereby providing assistance for tracking of the BDS3 B1I.

In an embodiment, as shown in FIG. 2, step S120 may include: S1201, determining carrier frequencies and phases of the B1C signals based on the code propagation delays of the B1C signals and the B1I signals, and a carrier tracking loop; and S1202, determining the code propagation delays of the B1I signals, based on a code tracking loop of the B1I signals.

Figure 3:
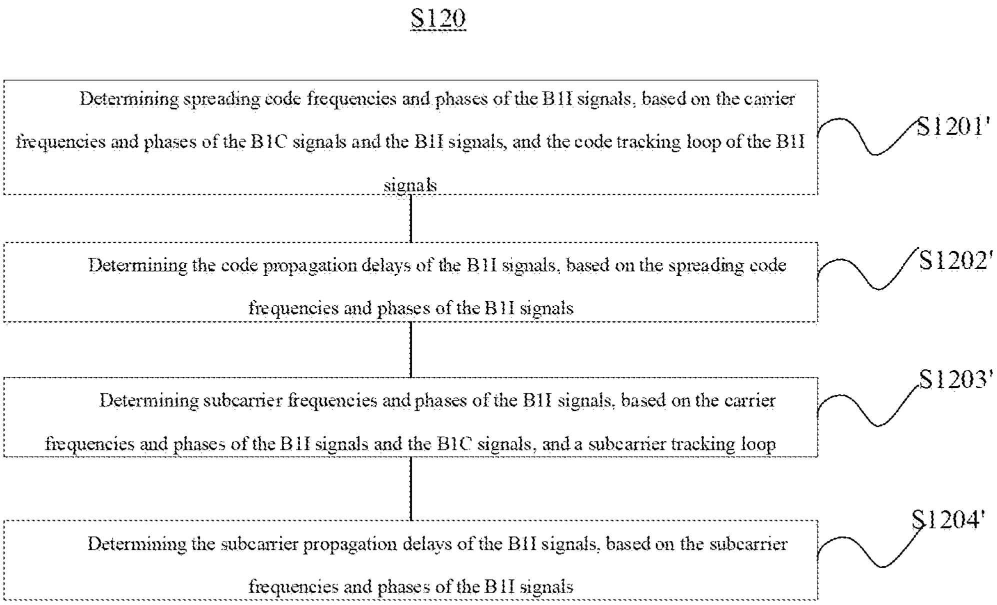
FIG. 3 illustrates a flowchart of acquiring observed quantities of B1I signals according to an embodiment of the present disclosure.

FIG. 3 illustrates a flowchart of acquiring observed quantities of B1I signals according to an embodiment of the present disclosure. In an embodiment, as shown in FIG. 3, step S120 may further include: S1201', determining spreading code frequencies and phases of the B1I signals, based on the carrier frequencies and phases of the B1I signals and the B1C signals, and the code tracking loop of the B1I signals; S1202', determining the code propagation delays of the B1I signals, based on the spreading code frequencies and phases of the B1I signals; S1203', determining subcarrier frequencies and phases of the B1I signals, based on the carrier frequencies and phases of the B1I signals and the B1C signals, and a subcarrier tracking loop; and S1204', determining the subcarrier propagation delays of the B1I signals, based on the subcarrier frequencies and phases of the B1I signals.

In step S130, the pseudo-range values and the code pseudo-range values from the satellites to the receiver are determined based on the observed quantities of the B1I signals and the B1C signals. In an embodiment, the code pseudo-range values are determined by the carrier phases of the B1C signals and the code propagation delays of the B1I signals; and the pseudo-range values are determined by the subcarrier propagation delays of the B1I signals and the code propagation delays of the B1I signals.

Figure 4:
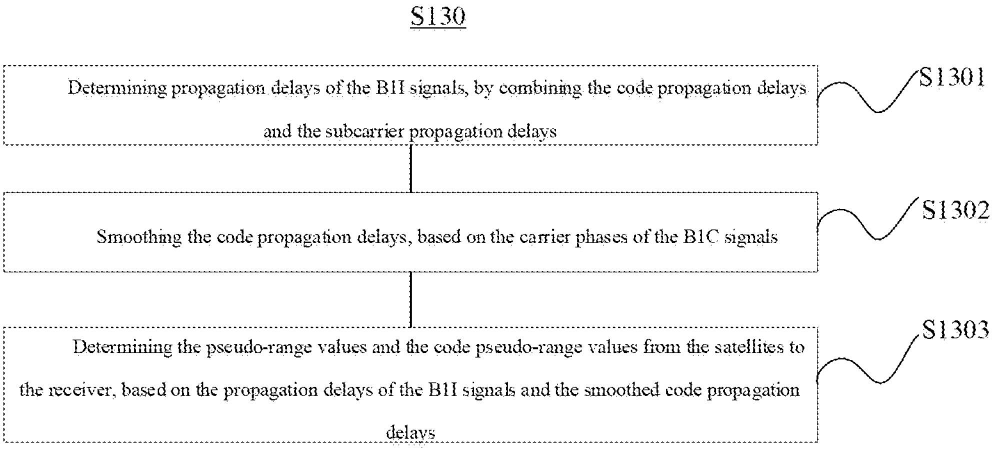
FIG. 4 illustrates a flowchart of determining pseudo-range values and code pseudo-range values from satellites to a receiver based on the observed quantities of the B1I signals and the B1C signals, according to an embodiment of the present disclosure.

FIG. 4 illustrates a flowchart of determining pseudo-range values and code pseudo-range values from satellites to a receiver based on the observed quantities of the B1I signals and the B1C signals, according to an embodiment of the present disclosure. In an embodiment, as shown in FIG. 4, step S130 may include: S1301, determining propagation delays of the B1I signals, by combining the code propagation delays and the subcarrier propagation delays; S1302, smoothing the code propagation delays, based on the carrier phases of the B1C signals; and S1303, determining the pseudo-range values and the code pseudo-range values from the satellites to the receiver, based on the propagation delays of the B1I signals and the smoothed code propagation delays.

In step S140, the ambiguity integer solutions of the propagation delays of the B1 wideband composite signals are determined based on the pseudo-range values and the code pseudo-range values. In an embodiment, step S140 may include: determining, based on the pseudo-range values and the code pseudo-range values, ambiguity float solutions of the propagation delays of the B1 wideband composite signals; and determining the ambiguity integer solutions based on the ambiguity float solutions.

In step S150, the ambiguities of the propagation delays of the B1 wideband composite signals are corrected by using the ambiguity integer solutions, and the unambiguous propagation delays of the B1 wideband composite signals are acquired, to perform unambiguous positioning on the location of the receiver. In an embodiment, the ambiguity integer solutions may be determined based on the ambiguity float solutions using a LAMBDA algorithm.

In particular, the ambiguity float solutions of the propagation delays of the B1 wideband composite signals are fed into the LAMBDA algorithm, and the LAMBDA algorithm is used to search to obtain the ambiguity integer solutions. When a subcarrier ambiguity estimated based on a code phase is correct, an ambiguity solution of the propagation delay is zero, and when the subcarrier ambiguity estimated by the code phase is erroneous, the ambiguity solution of the propagation delay is a non-zero integer, and based on the non-zero integer, erroneously estimated propagation delay ambiguities may be corrected.

Figure 5:
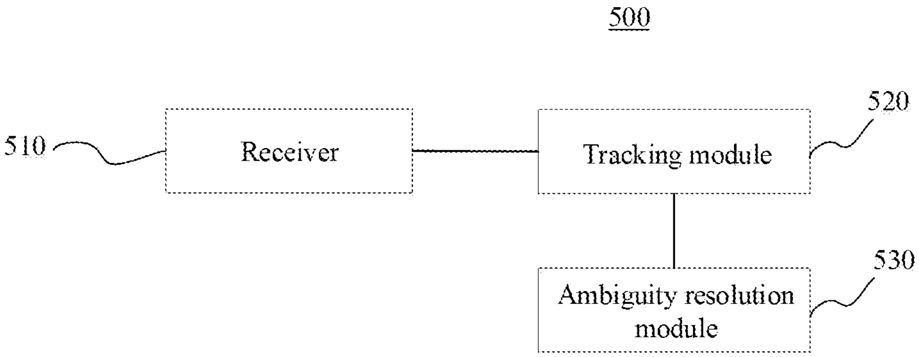
FIG. 5 illustrates a schematic diagram of an unambiguous positioning apparatus for B1 wideband composite signals of a satellite navigation system according to an embodiment of the present disclosure.

Another aspect of the present disclosure provides an unambiguous positioning apparatus for B1 wideband composite signals of a satellite navigation system. FIG. 5 illustrates a block diagram of an unambiguous positioning apparatus for B1 wideband composite signals of a satellite navigation system according to an embodiment of the present disclosure. As shown in FIG. 5, the apparatus 500 includes:

a receiver 510, configured to receive B1 wideband composite signals of multiple satellites, where the B1 wideband composite signals include: B1I signals and B1C signals;

a tracking module 520, configured to acquire observed quantities of the B1I signals and the B1C signals of the multiple satellites; and an ambiguity resolution module 530, configured to: determine, based on the observed quantities of the B1I signals and the B1C signals, pseudo-range values and code pseudo-range values from the satellites to the receiver; determine, based on the pseudo-range values and the code pseudo-range values, ambiguity integer solutions of propagation delays of the B1 wideband composite signals; and correct ambiguities of the propagation delays of the B1 wideband composite signals by using the ambiguity integer solutions, acquire unambiguous propagation delays of the B1 wideband composite signals, and perform unambiguous positioning on a location of the receiver.

The receiver 510 is configured to receive the B1 wideband composite signals of the multiple satellites, where the B1 wideband composite signals include: the B1I signals and the B1C signals. In an embodiment, the receiver, such as a GPS receiver, is applicable to satellite navigation signals.

The tracking module 520 is configured to acquire the observed quantities of the B1I signals and the B1C signals received by the receiver 510. In an embodiment, the observed quantities of the B1I signals and the B1C signals may include: carrier phases of the B1C signals, code propagation delays of the B1I signals, and subcarrier propagation delays of the B1I signals; the code pseudo-range values are determined by the carrier phases of the B1C signals and the code propagation delays of the B1I signals, and the pseudo-range values are determined by the subcarrier propagation delays of the B1I signals and the code propagation delays of the B1I signals.

In an embodiment, the tracking module 520 may be configured to: determine carrier frequencies and phases of the B1C signals based on the code propagation delays of the B1C signals and the B1I signals, and a carrier tracking loop; and determine the code propagation delays of the B1I signals, based on a code tracking loop of the B1I signals.

Figure 6:
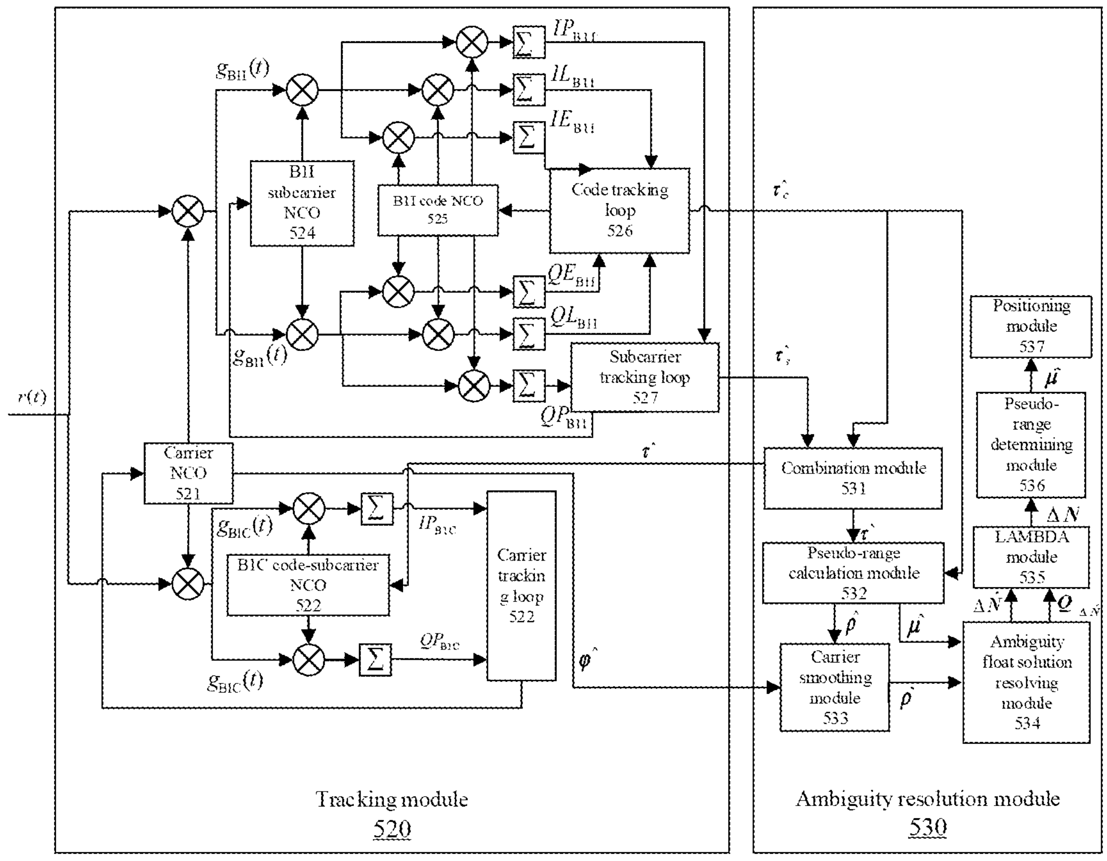
FIG. 6 illustrates a schematic diagram of a tracking module and an ambiguity resolution module according to an embodiment of the present disclosure.

FIG. 6 illustrates a schematic diagram of a tracking module and an ambiguity resolution module according to an embodiment of the present disclosure. Here, the tracking module 520 is configured to track the carrier phases of the B1C signals, the code propagation delays of the B1I signals, and the subcarrier propagation delays of the B1I signals.

In an embodiment, as shown in FIG. 6, when tracking an $i^{th}$ satellite signal, for a BDS3 B1C signal, a signal r(t) received by the receiver is first multiplied by a carrier generated by a carrier NCO (numerically controlled oscillator) 521 to obtain a baseband signal $g_{B1C,i}(t)$ of the BDS3 B1C of the $i^{th}$ satellite, from which the carrier is separated, where $\phi_1$ is the carrier frequency and phase of the B1C signal of the $i^{th}$ satellite signal estimated by a carrier tracking loop 523. A baseband IQ signal $I_{B1C,i}$, $Q_{B1C,i}$ is obtained by taking real and imaginary parts of the $g_{B1C,i}(t)$.

The baseband IQ signal $I_{B1C,i}$,$Q_{B1C,i}$ is multiplied with a local instantaneous B1C baseband signal of the $i^{th}$ satellite generated by a B1C code-subcarrier NCO 522, and an integration is perform thereto, to determine a signal $IP_{B1C,i}$, $QP_{B1C,i}$. Here, a phase of the B1C code-subcarrier NCO 522 is provided by BDS3 B1I tracking.

Phase discrimination and filtering are performed on the baseband IQ signal $IP_{B1C,i}$, $QP_{B1C,i}$ by the carrier tracking loop 523 to obtain an error of the carrier frequency and phase to correct the carrier NCO 521 and the carrier phase $\phi_i$ of the B1C signal. When the carrier phase of the B1C signal is determined, the carrier phase of the B1I signal is also determined, so that only a subcarrier phase of the B1I signal needs to be estimated without also estimating the carrier phase of the B1I signal, thus effectively solving the technical problem of coupling between the subcarrier phase and the carrier phase of modulated signals.

In an embodiment, the tracking module 520 may be further configured to: determine spreading code frequencies and phases of the B1I signals, based on the carrier frequencies and phases of the B1C signals and the B1I signals, and the code tracking loop of the B1I signals; determine the code propagation delays of the B1I signals, based on the spreading code frequencies and phases of the B1I signals; determine subcarrier frequencies and phases of the B1I signals, based on the carrier frequencies and phases of the B1I signals and the B1C signals, and a subcarrier tracking loop;

and determine the subcarrier propagation delays of the B1I signals, based on the subcarrier frequencies and phases of the B1I signals.

In an embodiment, as shown in FIG. 6, a receiving signal r(t) is multiplied with the carrier generated by the carrier NCO 521 to obtain a baseband signal $g_{B1C,i}(t)$, after the subcarrier of the B1I signal is separated from the baseband signal by multiplying the baseband signal with the subcarrier of the B1I signal generated by a B1I subcarrier NCO 524, the baseband signal is respectively multiplied with a local B1I ahead code, an immediate code, and a delayed code which are generated by a B1I code NCO 525, and integrated, where a signal $IP_{B1C,i}$, $QP_{B1C,i}$ enters a subcarrier tracking loop 527 for phase discrimination and filtering, to update the B1I subcarrier NCO 524 and determine a subcarrier propagation delay $\hat{\tau}_{s,i}$ of the B1I signal, and signals $IE_{B1I,i}$, $QE_{B1L,i}$, $IL_{B1L,i}$, $QL_{B1L,i}$ enter a code tracking loop 526 for phase discrimination and filtering, to update the B1I code NCO 525 and determine a code propagation delay $\hat{\tau}_{c,i}$ of the B1I signal, and acquire a propagation delay of the B1I signal based on $\hat{\tau}_{s,i}$ and $\hat{\tau}_{c,i}$.

Since the B1C signal has the same propagation delay as the B1I signal, the propagation delay $\hat{\tau}_i$ of the B1I signal obtained by tracking the B1I signal may be directly transferred to the B1C signal, so that the B1C code-subcarrier NCO 522 may accurately generate a local instantaneous code of the B1C signal, which alleviates the technical problem of severe ambiguity tracking of SCBOC (14,2) modulated signals.

For the ambiguity resolution module 530, in an embodiment, the ambiguity resolution module 530 may be configured to: determine propagation delays of the B1I signals, by combining the code propagation delays and the subcarrier propagation delays, the way of combination is:

$$\hat{\tau}_i = \hat{\tau}_{s,i} - T_s \times \text{round}\left(\frac{\hat{\tau}_{s,i} - \hat{\tau}_{c,i}}{T_s}\right),$$

where a round( ) function returns a result of rounding $$\frac{\hat{\tau}_{s,i} - \hat{\tau}_{c,i}}{T_s},$$

a propagation delay ambiguity of the B1I signal is:

$$\Delta N_i = \frac{\hat{\tau}_{s,i} - \hat{\tau}_{c,i}}{T_s},$$

when the code propagation delay $\hat{\tau}_{c,i}$ provides a correct subcarrier propagation delay ambiguity for the subcarrier propagation delay $\hat{\tau}_{s,i}$, the propagation delay ambiguity of the B1I signal is 0, and when the code propagation delay $\hat{\tau}_{c,i}$ can not provide the correct subcarrier propagation delay ambiguity for the subcarrier propagation delay $\hat{\tau}_{s,i}$, the propagation delay ambiguity of the B1I signal is not 0; smooth the code propagation delays, based on the carrier phases of the B1C signals; and determine the pseudo-range values and the code pseudo-range values from the satellites to the receiver, based on the propagation delays of the B1I signals and the smoothed code propagation delays.

In an embodiment, the ambiguity resolution module 530 may be configured to: determine, based on the pseudo-range values and the code pseudo-range values, ambiguity float solutions of the propagation delays of the B1 wideband composite signals; and determine the ambiguity integer solutions based on the ambiguity float solutions.

In an embodiment, the subcarrier propagation delay ambiguity corrected by the code propagation delay has an integer nature, while code pseudo-range observed values involved in position solving are of low accuracy and a positioning result of the pseudo-range observed values has a large error, which may spread into a solution of the subcarrier ambiguity. The ambiguity resolution module 530 as shown in FIG. 6 may be configured to correct the ambiguity of the propagation delay of the B1I signal.

As shown in FIG. 6, the ambiguity resolution module 530 generates via a combination module 531, the propagation delay of the B1I signal by combining the code propagation delay $\hat{\tau}_{c,i}$ of the B1I signal and the subcarrier propagation delay $\hat{\tau}_{s,i}$ of the B1I signal.

By using a pseudo-range calculation module 532, an unambiguous pseudo-range equation is established based on the code propagation delay $\hat{\tau}_{c,i}$ of the B1I signal acquired by the code tracking loop 526 as follows:

$$\hat{\rho}_i = \sqrt{(X_{s,i} - X_u)^T (X_{s,i} - X_u)} + C\delta T + I_i + T_i + n_{\hat{\rho},i} \quad 1)$$

where, $\hat{\rho}_i$ is the code pseudo-range value of the $i^{th}$ satellite calculated based on $\hat{\tau}_{c,i}$, $X_{s,i}$ is satellite coordinates of the $i^{th}$ satellite, $X_u$ is coordinates of the receiver, C is the speed of light, $\delta T$ is a clock difference of the receiver, $I_i$ is an ionospheric delay of the $i^{th}$ satellite, $T_i$ is a tropospheric delay of the $i^{th}$ satellite, and $n_{\rho,i}$ is code pseudo-range noise of the $i^{th}$ satellite calculated based on the code propagation delay of the B1I signal.

By using the pseudo-range calculation module 532, an ambiguity pseudo-range equation is established based on the propagation delay $\hat{\tau}_i$ of the B1I signal as follows:

$$\hat{\mu}_i = \sqrt{(X_{s,i} - X_u)^T (X_{s,i} - X_u)} + C\delta T + \Delta N_i \lambda + I_i + T_i + n_{\hat{\mu},i} \quad 2)$$

where, $\hat{\mu}_i$ is the pseudo-range value of the $i^{th}$ satellite calculated based on $\hat{\tau}_i$, $n_{\mu,i}$ is pseudo-range noise of the $i^{th}$ satellite calculated from the propagation delay of the B1I signal, $$\lambda = \frac{C}{2 f_{sc,B1I}}$$

is a distance corresponding to a subcarrier code slice of a BDS3 B1I signal, and $\Delta N_i$ is the ambiguity of the propagation delay of the B1 wideband composite signal of the $i^{th}$ satellite. Expanding the above two pseudo-range equations to first order, it may be obtained that:

$$\hat{\rho}_1 - d_i - I_i - T_i = e_i^T \begin{pmatrix} \delta x \\ \delta y \\ \delta z \end{pmatrix} + C\delta T + I_i + T_i + n_{\hat{\rho},i} \quad 3)$$

$$\hat{\mu}_i - d_i - I_i - T_i = e_i^T \begin{pmatrix} \delta x \\ \delta y \\ \delta z \end{pmatrix} + C\delta T + \Delta N_i \lambda + I_i + T_i + n_{\hat{\mu},i} \quad 4)$$

where, $d_i$ is a geometric distance from the $i^{th}$ satellite to the receiver, $e_i$ is a unit vector pointing from the receiver to the $i^{th}$ satellite, and $(\delta x,\delta y,\delta z)^T$ is an error of the coordinates of the receiver.

According to an embodiment of the present disclosure, in order to improve the correctness of subcarrier ambiguity resolution, the ambiguity resolution module 530 improves the precision of code pseudo-range observed quantities using an approach of carrier smoothing pseudo-range by using a carrier smoothing module 533. The approach of the carrier smoothing pseudo-range is as follows:

$$\tilde{\rho}_i(k) = \frac{1}{M}\rho_i(k) + \frac{M-1}{M}\left(\tilde{\rho}_i(k-1) + \frac{\hat{\varphi}_i(k)-\hat{\varphi}_i(k-1)}{f_{B1}}C\right) \quad 5)$$

where M represents a length of a smoothing window, k represents a current moment, k−1 represents a previous moment, and is the carrier phase of the $i^{th}$ satellite estimated by the carrier NCO 521. Therefore, the ambiguity resolution module 530 acquires the ambiguities $\Delta N_i$ of the propagation delays of the B1 wideband composite signals based on the smoothed code pseudo-range values $\tilde{\rho}_i(k)$ of the satellites and the pseudo-range values $\hat{\mu}_i$ calculated from the propagation delays of the B1I signals.

According to an embodiment of the present disclosure, for a system having m satellites, an equation set of pseudo-ranges is obtained as follows:

$$\begin{pmatrix} \tilde{\rho}_1 - d_1 - I_1 - T_1 \\ \vdots \\ \tilde{\rho}_m - d_m - I_m - T_m \\ \hat{\mu}_1 - d_1 - I_i - T_i \\ \vdots \\ \hat{\mu}_m - d_m - I_m - T_m \end{pmatrix} = \begin{pmatrix} e_1^T & C & 0 & \dots & 0 \\ \vdots & \vdots & \vdots & \ddots & \vdots \\ e_m^T & C & 0 & \dots & 0 \\ e_1^T & C & \lambda & 0 & \dots \\ \vdots & \vdots & 0 & \ddots & \ddots \\ e_m^T & C & \vdots & \ddots & \lambda \end{pmatrix} \begin{pmatrix} \delta x \\ \delta y \\ \delta z \\ \delta T \\ \Delta N_1 \\ \vdots \\ \Delta N_m \end{pmatrix} + \begin{pmatrix} n_{\tilde{\rho},1} \\ \vdots \\ n_{\tilde{\rho},m} \\ n_{\hat{\mu},1} \\ \vdots \\ n_{\hat{\mu},m} \end{pmatrix} \quad 6)$$

From the above equations, there are a total of (m+4) to-be-estimated parameters in the equations, in order to ensure full rank equations, the number of satellites m needs to be greater than or equal to 4, which is consistent with a minimum number of satellites required for pseudo-range direct positioning, which indicates that as long as the number of satellites can meet the requirements for positioning, the ambiguity resolution module 530 is able to resolve the ambiguity of the propagation delay of the B1 wideband composite signal accordingly. This is defined as follows:

$$Y = \begin{pmatrix} \tilde{\rho}_1 - d_1 - I_1 - T_1 \\ \vdots \\ \tilde{\rho}_m - d_m - I_m - T_m \\ \hat{\mu}_1 - d_1 - I_i - T_i \\ \vdots \\ \hat{\mu}_m - d_m - I_m - T_m \end{pmatrix}, \quad 7)$$

$$H = \begin{pmatrix} e_1^T & C & 0 & \dots & 0 \\ \vdots & \vdots & \vdots & \ddots & \vdots \\ e_m^T & C & 0 & \dots & 0 \\ e_1^T & C & \lambda & 0 & \dots \\ \vdots & \vdots & 0 & \ddots & \ddots \\ e_m^T & C & \vdots & \ddots & \lambda \end{pmatrix},$$

-continued $$\alpha = \begin{pmatrix} \delta x \\ \delta y \\ \delta z \\ \delta T \\ \Delta N_1 \\ \vdots \\ \Delta N_m \end{pmatrix},$$

$$v = \begin{pmatrix} n_{\tilde{\rho},1} \\ \vdots \\ n_{\tilde{\rho},m} \\ n_{\hat{\mu},1} \\ \vdots \\ n_{\hat{\mu},m} \end{pmatrix}$$

From this, the System of Pseudo-Range Equations May be Organized as:

$$y = H\alpha + v \quad 8)$$

Define a Covariance Matrix of v as Q, Solving the Above Equation is Equivalent to Solving:

$$\min \|Y - H\alpha\|_Q^2 \quad 9)$$

A Weighted Least Squares Solution is Used to Obtain:

$$\alpha = \left(H^T Q H\right)^{-1} H^T Q Y \quad 10)$$

Since the position of the receiver is unknown, the weighted least squares algorithm needs to be converged by iterations, and an iteration formula is as follows:

$$\beta_k = \beta_{k-1} + \delta\beta_k \quad 11)$$

where, $\beta_k = (x, y, z, \delta T)^T$ is the coordinates and clock difference of the receiver in the $k^{th}$ iteration. When $\|\delta\beta\| < Th$, the algorithm converges to obtain an ambiguity float solution $\Delta\hat{N}$ of the propagation delay of the B1 wideband composite signal, where Th is a set threshold, which may be set by a user according to the actual situation, for example, Th may be set to 1 E-4.

According to an embodiment of the present disclosure, this ambiguity float solution and its covariance matrix $Q_{\Delta\hat{N}}$ are input into a LAMBDA module 535 to be resolved into an ambiguity integer solution $\Delta\tilde{N}$.

$$\Delta\tilde{N} = LAMBDA\left(\Delta\hat{N}, Q_{\Delta\hat{N}}\right) \quad 12)$$

Based on the ambiguity integer solution of the propagation delay of the B1 wideband composite signal obtained by resolution based on the LAMBDA algorithm, an unambiguous pseudo-range value $\tilde{\mu}_i$ is obtained by using a pseudo-range determining module 536, which may be expressed as:

$$\tilde{\mu}_i = \hat{\mu}_i - \Delta\tilde{N}_i\lambda \quad 13)$$

It should be noted that although a positioning result of the receiver may be obtained when resolving the ambiguity floating solution, this positioning result is biased because the problem of incorrect subcarrier ambiguity estimation has not been eliminated, and is only used to assist in resolving the ambiguity of the propagation delay of the B1 wideband composite signal, and is not used as the final positioning result of the receiver. Finally, the unambiguous pseudo-range value $\tilde{\mu}_i$ is input into a positioning module 537, thereby achieving unambiguous positioning on the receiver.

Based on the code propagation delays $\check{\tau}_{c,i}$ of the unambiguous B1I signals and the propagation delays $\hat{\tau}_i$ of the ambiguous B1I signals of satellite signals in the same epoch, the pseudo-range equations based on the code propagation delays and propagation delays of the B1I signals are established by using the pseudo-range calculation module 532; and the carrier phases of the B1C signals are used to improve the correctness of subcarrier ambiguity resolution by smoothing the code propagation delays of the B1I signals. Then, the ambiguities $\Delta N_i$ of the propagation delays of the B1 wideband composite signals of satellite are used as to-be-estimated parameters, and are resolved together with the position and the clock difference of the receiver to obtain the ambiguity float solutions of the propagation delays; the ambiguity integer solutions of the propagation delays are obtained by searching using the LAMBDA algorithm, when the subcarrier ambiguity estimated by the code propagation delay of the B1I signal is error-free, the obtained ambiguity of the propagation delay of the B1 wideband composite signal is zero, and when the ambiguity of the subcarrier of the B1I signal estimated by the code propagation delay of the B1I signal is wrong, the obtained ambiguity of the propagation delay of the B1 wideband composite signal is a non-zero integer, accordingly, erroneously estimated propagation delay ambiguities may be corrected, and unambiguous positioning is performed on the receiver.

Another aspect of the present disclosure provides an unambiguous positioning apparatus for a B1 wideband composite signal of a satellite navigation system, the apparatus including a processor, and a memory connected via a bus or an interconnector. The processor may represent a single processor including a single processor core or multiple processor cores or multiple processors. The processor may represent one or more general-purpose processors, such as microprocessor, or central processing unit (CPU). In particular, the processor may be a complex instruction set computing (CISC) microprocessor, a reduced instruction set computing (RISC) microprocessor, a very long instruction word (VLIW) microprocessor, or a processor that implements another instruction set, or a processor that implements a combination of instruction sets. The processor may alternatively be one or more specialized processors, such as application specific integrated circuit (ASIC), cellular or baseband processor, field programmable gate array (FPGA), digital signal processor (DSP), network processor, graphics processor, communication processor, cryptographic processor, co-processor, embedded processor, or any other type of logic capable of processing instructions.

The processor (which may be a low-power multi-core processor suite interface, such as an ultra-low voltage processor) may act as a main processing unit and central hub for communicating with various components of the system. Such processor may be implemented as a system on a chip (SoC). The processor is configured to execute instructions for performing the method discussed in the present disclosure.

The processor may be in communication with the memory, and the memory may, in an embodiment, be implemented via multiple memory apparatuses to provide quantitative system storage. The memory may include one or more volatile storage (or memory) apparatuses, such as random access memory (RAM), dynamic RAM (DRAM), synchronous DRAM (SDRAM), static RAM (SRAM), or other types of storage apparatuses. The memory may store information including a sequence of instructions executed by the processor or any other apparatus. For example, executable code and/or data for various operating systems, apparatus drivers, firmware (e.g., basic input/output system or BIOS), and/or applications may be loaded into the memory and executed by the processor. The operating system may be any type of operating system, for example, a robotic operating system (ROS), a Windows® operating system from Microsoft® Corporation, a Mac OS®/iOS® from Apple® Corporation, Android® from Google® Corporation, LINUX, UNIX, or other real-time or embedded operating systems.

A mass storage device may alternatively be coupled to the processor in order to provide permanent storage of information such as data, applications, or one or more operating systems. In various embodiments, such mass storage device may be implemented via a solid-state device (SSD) in order to achieve thinner and lighter system design and improve system responsiveness. However, in other embodiments, the mass storage device may be implemented primarily using a hard disc drive (HDD), where a small volume SSD storage device serves as an SSD cache to enable non-volatile storage of contextual state and other such information during a power failure event, thereby enabling fast power-up upon restart of system activity. Alternatively, a flash memory apparatus may be coupled to the processor, for example, via a serial peripheral interface (SPI). Such flash memory apparatus may provide non-volatile storage of system software, the system software including the BIOS and other firmware of the system.

Another aspect of the present disclosure provides a computer readable medium, where the computer readable storage medium may also be used to permanently store the method described above. Although the computer readable storage medium is shown as a single medium in exemplary embodiments, the term "computer readable storage medium" should be considered to include a single medium or multiple mediums (e.g., centralized or distributed databases and/or associated caches and servers) storing one or more of the instruction sets. The term "computer readable storage medium" should also be considered to include any medium capable of storing or encoding instruction sets for execution by a machine and causing the machine to perform any one or more of the methods of the present disclosure. Accordingly, the term "computer readable storage medium" should be considered to include, but is not limited to, solid-state memory as well as optical medium and magnetic medium, or any other non-transitory machine readable medium.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. An unambiguous positioning method for B 1 wideband composite signals of a satellite navigation system, the method comprising:

receiving the B 1 wideband composite signals of a plurality of satellites, wherein the B 1 wideband composite signals comprise B 1I signals and B 1C signals;

acquiring observed quantities of the B 1I signals and the B 1C signals;

determining, based on the observed quantities of the B 1I signals and the B 1C signals, pseudo-range values and code pseudo-range values from the satellites to a receiver;

determining, based on the pseudo-range values and the code pseudo-range values, ambiguity integer solutions of propagation delays of the B 1 wideband composite signals; and correcting ambiguities of the propagation delays of the B 1 wideband composite signals by using the ambiguity integer solutions, acquiring unambiguous propagation delays of the B 1 wideband composite signals, and performing unambiguous positioning on a location of the receiver.

2. The method according to claim 1, wherein, a step of determining, based on the pseudo-range values and the code pseudo-range values, the ambiguity integer solutions of propagation delays of the B1 wideband composite signals, comprises:

determining, based on the pseudo-range values and the code pseudo-range values, ambiguity float solutions of the propagation delays of the B1 wideband composite signals; and determining the ambiguity integer solutions based on the ambiguity float solutions.

3. The method according to claim 2, wherein, the observed quantities comprise: carrier phases of the B1C signals, code propagation delays of the B1I signals, and subcarrier propagation delays of the B1I signals, wherein, a step of determining the pseudo-range values and the code pseudo-range values from the satellites to the receiver comprises:

determining the code pseudo-range values by using the carrier phases of the BIC signals and the code propagation delays of the BII signals; and determining the pseudo-range values by using the subcarrier propagation delays of the B1I signals and the code propagation delays of the B1I signals.

4. The method according to claim 2, wherein the observed quantities comprise: carrier phases of the B1C signals, code propagation delays of the B1I signals, and subcarrier propagation delays of the B1I signals, wherein a step of acquiring the observed quantities of the B1I signals and the B1C signals comprises:

determining carrier frequencies of the B1C signals and the carrier phases of the B1C signals, based on the code propagation delays of the B1C signals and the B1I signals, and a carrier tracking loop; and determining the code propagation delays of the B1I signals, based on a code tracking loop of the B1I signals.

5. The method according to claim 4, wherein a step of acquiring the observed quantities of the B1I signals and the B1C signals comprises:

determining spreading code frequencies and phases of the B1I signals, based on the carrier frequencies and phases of the B1I signals and the BIC signals, and the code tracking loop of the B1I signals;

determining the code propagation delays of the B1I signals, based on the spreading code frequencies and phases of the B1I signals;

determining subcarrier frequencies and phases of the B1I signals, based on the carrier frequencies and phases of the B1I signals and the B1C signals, and a subcarrier tracking loop; and determining the subcarrier propagation delays of the B1I signals, based on the subcarrier frequencies and phases of the B1I signals.

6. The method according to claim 5, wherein, a step of determining, based on the observed quantities, the pseudo-range values and the code pseudo-range values from the satellites to the receiver comprises:

determining propagation delays of the B1I signals, by combining the code propagation delays and the subcarrier propagation delays;

smoothing the code propagation delays, based on the carrier phases of the BIC signals; and determining the pseudo-range values and the code pseudo-range values from the satellites to the receiver, based on the propagation delays of the B1I signals and the smoothed code propagation delays.

7. The method according to claim 2, wherein, a step of determining the ambiguity integer solutions based on the ambiguity float solutions comprises:

determining, using a LAMBDA algorithm, the ambiguity integer solutions based on the ambiguity float solutions.

8. An unambiguous positioning apparatus for B1 wideband composite signals of a satellite navigation system, the apparatus comprising: a processor and a memory storing instructions executable by the processor; wherein the instructions, when executed by the processor, cause the processor to perform operations comprising:

obtaining the B1 wideband composite signals of a plurality of satellites, wherein the B1 wideband composite signals comprise B1I signals and B1C signals;

acquiring observed quantities of the B1I signals and the B1C signals;

determining, based on the observed quantities of the B1I signals and the B1C signals, pseudo-range values and code pseudo-range values from the satellites to a receiver;

determining, based on the pseudo-range values and the code pseudo-range values, ambiguity integer solutions of propagation delays of the B1 wideband composite signals; and correcting ambiguities of the propagation delays of the B1 wideband composite signals by using the ambiguity integer solutions, acquire unambiguous propagation delays of the B1 wideband composite signals, and perform unambiguous positioning on a location of the receiver.

9. The apparatus according to claim 8, wherein, determining, based on the pseudo-range values and the code pseudo-range values, the ambiguity integer solutions of propagation delays of the B1 wideband composite signals, comprises:

determining, based on the pseudo-range values and the code pseudo-range values, ambiguity float solutions of the propagation delays of the B1 wideband composite signals; and determining the ambiguity integer solutions based on the ambiguity float solutions.

10. The apparatus according to claim 9, wherein, the observed quantities comprise: carrier phases of the B1C signals, code propagation delays of the B1I signals, and subcarrier propagation delays of the B1I signals, wherein determining the ambiguity integer solutions of propagation delays of the B1 wideband composite signals comprise:

determining the code pseudo-range values by using the carrier phases of the B1C signals and the code propagation delays of the B1I signals; and determining the pseudo-range values by using the subcarrier propagation delays of the B1I signals and the code propagation delays of the B1I signals.

11. The apparatus according to claim 9, wherein, the observed quantities comprise: carrier phases of the B1C signals, code propagation delays of the B1I signals, and subcarrier propagation delays of the B1I signals, wherein acquiring the observed quantities of the B1I signals and the B1C signals comprises:

determining carrier frequencies of the B1C signals and the carrier phases of the B1C signals, based on the code propagation delays of the B1C signals, and the B1 signals, and a carrier tracking loop; and determining the code propagation delays of the B1I signals, based on a code tracking loop of the B1I signals.

12. The apparatus according to claim 11, wherein, acquiring the observed quantities of the B1I signals and the B1C signals comprises:

determining spreading code frequencies and phases of the B1I signals, based on the carrier frequencies and phases of the B1I signals and the B1C signals, and the code tracking loop of the B1I signals;

determining the code propagation delays of the B1I signals, based on the spreading code frequencies and phases of the B1I signals;

determining subcarrier frequencies and phases of the B1I signals, based on the carrier frequencies and phases of the B1I signals and the B1C signals, and a subcarrier tracking loop; and determining the subcarrier propagation delays of the B1I signals, based on the subcarrier frequencies and phases of the B1I signals.

13. The apparatus according to claim 12, wherein, determining, based on the observed quantities, the pseudo-range values and the code pseudo-range values from the satellites to the receiver comprises:

determining propagation delays of the B1I signals, by combining the code propagation delays and the subcarrier propagation delays;

smoothing the code propagation delays, based on the carrier phases of the BIC signals; and determining the pseudo-range values and the code pseudo-range values from the satellites to the receiver, based on the propagation delays of the B1I signals and the soothed code propagation.

14. The apparatus according to claim 9, wherein, determining the ambiguity integer solutions based on the ambiguity float solutions comprises:

determining, using a LAMBDA algorithm, the ambiguity integer solutions based on the ambiguity float solutions.

15. A non-transitory storage medium, storing computer-executable instructions, wherein the instructions, when executed by one or more processors, cause the one or more processors to perform operations comprising:

obtaining B1 wideband composite signals of a plurality of satellites, wherein the B 1 wideband composite signals comprise B 1I signals and B 1 C signals;

acquiring observed quantities of the B1I signals and the B1C signals;

determining, based on the observed quantities of the B1I signals and the BIC signals, pseudo-range values and code pseudo-range values from the satellites to a receiver;

determining, based on the pseudo-range values and the code pseudo-range values, ambiguity integer solutions of propagation delays of the B1 wideband composite signals; and correcting ambiguities of the propagation delays of the B1 wideband composite signals by using the ambiguity integer solutions, acquiring unambiguous propagation delays of the B 1 wideband composite signals, and performing unambiguous positioning on a location of the receiver.

16. The storage medium according to claim 15, wherein, determining, based on the pseudo-range values and the code pseudo-range values, the ambiguity integer solutions of propagation delays of the B1 wideband composite signals, comprises:

determining, based on the pseudo-range values and the code pseudo-range values, ambiguity float solutions of the propagation delays of the B1 wideband composite signals; and determining the ambiguity integer solutions based on the ambiguity float solutions.

17. The storage medium according to claim 16, wherein, the observed quantities comprise: carrier phases of the B1C signals, code propagation delays of the B1I signals, and subcarrier propagation delays of the B1I signals, wherein determining the ambiguity integer solutions of propagation delays of the B1 wideband composite signals comprise:

determining the code pseudo-range values by using the carrier phases of the BIC signals and the code propagation delays of the B1I signals; and determining the pseudo-range values by using the subcarrier propagation delays of the B1I signals and the code propagation delays of the B1I signals.

18. The storage medium according to claim 16, wherein, the observed quantities comprise: carrier phases of the B1C signals, code propagation delays of the B1I signals, and subcarrier propagation delays of the B1I signals, wherein acquiring the observed quantities of the B1I signals and the B1C signals comprises:

determining carrier frequencies of the B1C signals and the carrier phases of the B1C signals, based on the code propagation delays of the B1C signals, and the BII signals, and a carrier tracking loop; and determining the code propagation delays of the B1I signals, based on a code tracking loop of the B1I signals.

19. The storage medium according to claim 18, wherein, acquiring the observed quantities of the B1I signals and the B1C signals comprises:

determining spreading code frequencies and phases of the B1I signals, based on the carrier frequencies and phases of the B1I signals and the B1C signals, and the code tracking loop of the B1I signals;

determining the code propagation delays of the B1I signals, based on the spreading code frequencies and phases of the B1I signals;

determining subcarrier frequencies and phases of the B1I signals, based on the carrier frequencies and phases of the B1I signals and the B1C signals, and a subcarrier tracking loop; and determining the subcarrier propagation delays of the B1I signals, based on the subcarrier frequencies and phases of the B1I signals.

20. The storage medium according to claim 19, wherein, determining, based on the observed quantities, the pseudo-range values and the code pseudo-range values from the satellites to the receiver comprises:

determining propagation delays of the B1I signals, by combining the code propagation delays and the sub-carrier propagation delays;

smoothing the code propagation delays, based on the carrier phases of the BIC signals; and determining the pseudo-range values and the code pseudo-range values from the satellites to the receiver, based on the propagation delays of the B1I signals and the soothed code propagation.

* * * * *